Dec. 13, 1938.  E. L. RIESKE  2,140,255
AUTOMATIC CLUTCH COUPLING
Filed July 30, 1936
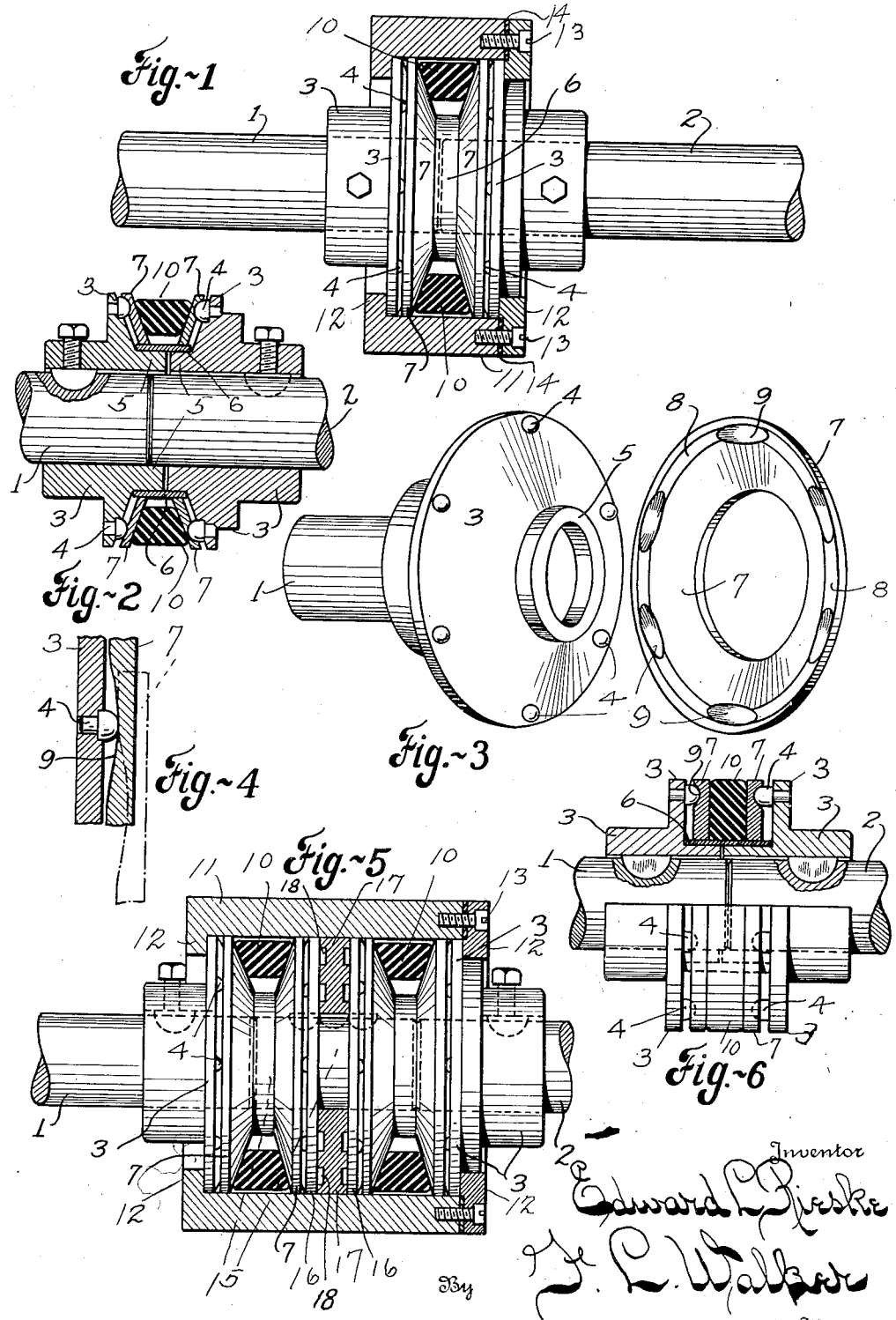

Patented Dec. 13, 1938

2,140,255

UNITED STATES PATENT OFFICE 2,140,255

AUTOMATIC CLUTCH COUPLING

Edward L. Rieske, Dayton, Ohio

Application July 30, 1936, Serial No. 93,531

12 Claims. (Cl. 64—27)

This invention relates to shaft couplings and more particularly to a frictional coupling automatically engaged by the initial relative rotative movement of the drive element.

In motor driven apparatus wherein the motor must start under load, a considerable initial effort or starting torque is required to overcome inertia. However, by permitting the driving motor a limited initial independent starting movement even though it may be but a partial rotation, the starting strain is greatly relieved and power requirement is minimized.

The present coupling device is designed to enable an initial relative starting movement of the motor independently of the driven load and to thereafter automatically connect the motor with the driven load or the driving and driven elements one with the other.

The object of the invention is to improve the construction as well as the means and mode of operation of shaft couplings whereby they may not only be economically manufactured, but will be more efficient in use, automatic in action, uniform in operation, of compact construction, having relatively few parts, and unlikely to get out of repair.

A further object of the invention is to provide means actuated by the initial rotation of the driving element for compressing frictional clutch means to operatively interconnect the driven element therewith.

A further object of the invention is to provide frictional coupling means, the engaging pressure of which will be automatically increased proportional to the driving power requirement.

A further object of the invention is to provide a delayed action frictional coupling device which automatically will become operative after lapse of an initial period of operation of the driving element.

A further object of the invention is to provide a frictional coupling of more or less flexible character applicable to a wide variety of installations and wherein the lapsed time period or degree of initial independent operation of the driving element may be varied to meet different conditions of operation.

A further object of the invention is to provide a frictional shaft coupling assembly embodying a succession of frictional elements and coacting devices for use under different driving conditions and power requirements.

A further object of the invention is to provide a shaft coupling having the advantageous features of construction, and meritorious characteristics herein mentioned.

With the above primary and other incidental objects in view as will more fully appear in the specification, the invention consists of the features of construction, the parts and combinations thereof, and the mode of operation, or their equivalents, as hereinafter described and set forth in the claims.

Referring to the accompanying drawing wherein is shown the preferred but obviously not necessarily the only form of the embodiment of the invention, Fig. 1 is a side elevation partly in section of an automatic frictional shaft coupling embodying the present invention.

Fig. 2 is a further sectional view thereof.

Fig. 3 is a perspective view of the complementary relatively rotatable cam element.

Fig. 4 is an enlarged detail sectional view illustrative of the camming action effected upon relative rotation of driving and driven elements.

Fig. 5 is a view similar to Fig. 1 of a duplex coupling assembly illustrative of the manner in which the coupling may be extended to include multiple sections or units.

Fig. 6 is a side elevation of a further modification employing flat elements in lieu of the conical elements illustrated in the preceding views.

Like parts are indicated by similar characters of reference throughout the several views.

Referring to the accompanying drawing, 1 is the driven shaft and 2 the driving shaft, the functions of which, however, may be reversed. That is to say, either shaft 1 or 2 may be employed as a driver and the other as the driven element. Fixedly secured to each of the shafts 1 and 2 contiguous to their adjacent ends are conical discs 3 projecting from the face of which in different radial positions are rounded or ball headed studs 4. The discs 3 are provided on their adjacent faces with shallow recessed hubs 5 surrounded by a ring 6. The end of one of the shaft elements is extended beyond the conical disc 3 carried thereby into the recessed hub 5 of the opposing disc to insure accurate centering of the driving and driven elements and the discs carried thereby to further enable a slight axial floating movement.

Disposed closely adjacent to the conical faces of the respective heads or discs 3 and substantially conforming thereto is a pair of conical rings 7 which are free for limited rotative and axial adjustment relative to their corresponding heads or discs 3. The inner or concave faces of the conical rings 7 are provided adjacent to their peripheries with an annular rib 8. This rib 8 is interrupted at spaced intervals by concave grooved depressions 9, the position and spacing of which agree with those of the projecting studs 4 carried by the heads or discs 3. In their assembled relation the studs 4 are seated within the concave grooves or depressions 9 in the inner face of the conical clamp rings 7. Interposed between the rings 7 is an annular friction member 10 which is preferably, although not necessarily, of rubber or rubber impregnated fabrics. However, any suitable friction material of which there are numerous forms available upon the market may be employed.

Surrounding the assembly is housing 11 which is revoluble relative to the head 3 and rings 7 and within which the peripheries of the heads 3 and rings 7 have a running fit. The friction ring 10 is of slightly less diameter than the interior of the revoluble housing 11 and is normally spaced out of contact therewith, but under compression will expand into frictional engagement with the interior of the housing. The housing 11 is provided with flanges 12 at opposite ends which overhang the respective driving and driven heads 3. One of these flanges 12 is removably secured by screws 13.

Normally the studs 4 carried by the respective heads 3 are seated in the deepest or medial portion of the grooved depressions 9 in the inner faces of the rings 7. In such relation the rings 7 are permitted to approach the heads 3 and therefore exert little or no clamping effect upon the interposed annular frictional element 10. There being a minimum of frictional resistance, the drive shaft and associated head 3 carried thereby are permitted an initial independent rotative movement. However, the inertia of the ring 7 associated with the said driving head 3 and such sliding contact as the ring 7 may have with the interposed annular friction element 10 causes a slight retarding influence upon the ring 7 thus enabling a slight relative rotative movement of the driving head 3 in which the studs 4 advance within the cam depressions 9 out of the deepest or medial position therein onto the tapered or inclined surface thereby increasing the driving engagement between the head 3 and the ring 7 and forcing the ring axially away from the driving head 3 against the interposed annular friction element 10 thereby increasing the frictional contact therewith. The pressure against the ring 10 increases the frictional engagement of such element with the second ring 7 associated with the driven head 3 thereby tending to rotatively advance such second ring 7 independently of its associated head 3. In such independent rotative adjustment of the ring 7 relative to the head 3 the cam depressions 9 are shifted relative to the engaging studs 4 of the driven head 3 thereby further increasing the compressive pressure and frictional engagement upon the interposed annular element 10. Such relative rotative movement of the rings 7 relative to the driven head is of limited extent but is sufficient to cause the inclined portions of the several depressions 9 to engage with camming effect the studs 4 of the driven head and to carry the driven head 3 and its associated shaft 2 in a forward direction. Thereafter the driving and driven shaft 2 and 1 and their associated elements 3 and 7 frictionally interconnected by the intermediate annular element 10 continue to rotate in unison.

As before mentioned, the driving and driven shafts are preferably capable of a very limited axial floating movement. The extent of this axial adjustment toward and from each other is limited by the relative spacing of the flanges 12 of the surrounding annular housing 11 against which the driving and driven heads 3 abut when the assembly is expanded by the relative rotative adjustment of the rings 7 and heads 3. This degree of axial floating movement may be regulated by adjustment of the screws 13 and by inserting or removing shims 14 intermediate the removable flange 12 and the housing 11. This capability for axial movement within the limits defined by the housing 11 determines to some extent the time interval elapsing between the initial rotation of the driving shaft and the induced movement of the driven shaft. By permitting a greater freedom of the assembly within the housing 11 the studs 4 are allowed to ride further up the inclined surfaces of the depressions 9 thereby permitting a greater degree of relative adjustment of the rings 7 and heads 3 before sufficient frictional pressure is induced to carry the driven shaft and head 3 in unison with the driving element.

While the invention has been illustrated in Fig. 1 as a single coupling unit it is to be understood that the coupling may be extended to embody multiple units two of which have been shown in combination in Fig. 5. In Fig. 5 the driving and driven shaft 1 and 2 and associated conical heads 3 and accompanying rings 7 are like those heretofore described. That is to say, the driven and driving heads 3 are fixedly secured upon the respective shafts 1 and 2 and carry studs 4 engaging in the grooved cam depressions 9 of the adjacent rings 7. Interposed between the driving and driven shafts 2 and 1 is a relatively short independent shaft 15 shown by dotted lines in Fig. 5 which carries in spaced relation conical discs or heads 16 corresponding to the driving and driven heads 3. The heads 16 are keyed upon the intermediate short shaft 15 for unison rotation therewith, but are free thereon for a limited axial adjustment. Interposed between the intermediate heads 16 is a disc 17 against which the discs 16 abut at opposite sides. The intermediate disc 17 is provided with a series of grooves or depressions 18 to minimize the tendency of the several elements to adhere one to the other under pressure. This intermediate disc 17 is likewise keyed to the shaft 15 for unison rotation but is free for limited axial adjustment thereon in unison with the sliding adjustment of the heads 16. Each of the intermediate axially adjustable heads 16 is provided with a series of studs 4 corresponding to those of the driving and driven heads 3. Associated with each of the heads 16 is a corresponding conical ring 7 having in their concave faces spaced grooved cam depressions 9 for engagement of the studs 4 carried by the respective heads 16. Interposed between each contiguous pair of rings 7 is an annular friction element 10. The construction and operation is quite analogous to that shown in Fig. 1 and heretofore described except that as the driving head 3 effects its initial rotative movement relative to its accompanying clamp ring 7, the latter being moved axially exerts its pressure against the friction element 10 which transmits the pressure to the complementary rings 7 associated with the intermediate heads 16. The lateral pressure transmitted through the intermediate friction element 10 together with the camming action incident to an initial relative rotation of the conical clamp ring 7 relative to the intermediate head 16 causes the latter to be cammed axially upon the intermediate shaft 15 against the yielding resistance of the intermediate disc 17. The disc 17 being thrust axially against the second head 16 transmits the pressure to the second friction element 10. In the meantime the rings 7 associated with the first intermediate head 16 has effected a limited rotative adjustment relative to the head 16 and when the camming pressure becomes sufficient it carries the engaged disc 16 with it which disc being keyed upon the shaft 15 causes a corresponding rotative motion of the intermediate disc 17 and the companion disc 16. The latter by exerting camming action upon the complementary disc 17 as the studs 4 ride up the inclines of the grooved depressions 9 in such rings effects axial compressive adjustment of the rings 7 against the second friction element 18 to increase its frictional contact therewith and press the friction element 18 against the last of series of rings 7. The resulting rotative movement of this last ring 7 of the series induces sufficient camming pressure to carry with it the driven head 3 thereby rotating the driven shaft 2 in unison with the drive shaft 1. The degree of relative movement between the respective elements of the series is determined as before described by the degree of axial play allowed to the several elements of the assembly within the limit of the surrounding housing 11. The intermediate friction elements 18 are normally out of contact engagement with the interior of the surrounding housing 11. However when subjected to compression between the opposing rings 7 the annular friction element 18 to increase the frictional driving engagement with the interior of the housing 11 which limits its expansive tendency and further pressure is transmitted transversely of the element 18 to increase the frictional driving engagement of the rings 7 therewith.

While the preferred construction is that illustrated in Figs. 1 to 5 inclusive employing conical driving heads or discs and corresponding conical clamp rings engaging concave lateral faces of the annular friction element 18 the invention is not limited to such specific construction but as illustrated in Fig. 6 the several driving heads of discs 3 and complementary clamp rings 7 may be flat or planar.

The flat heads or discs are provided with studs 4 slidingly engageable in the cam depressions 9 in the manner before described. The operation and function is quite the same, although the tapered or conical form of embodiment is preferred.

When the driving power is retarded or arrested the momentum of the driven load will tend to advance the driven elements relative to the driving elements or momentarily their driving and driven relation is reversed, and the resulting slight advance movement of the driven members relative to the driving members causes the studs 4 to travel from the higher to the lower areas of the cam depressions, thereby relaxing the tension upon the rings and interposed friction member to release the coupling preparatory to the next starting operation.

Under some conditions the present coupling may function as a safety device serving to release the driving connection under excessive resistance of the driven load.

If through accident or otherwise rotation of the driven shaft is unduly retarded to such extent as to overcome the resistance of the frictional engagement of the coupling elements, providing the resistance of the interposed friction ring to compressive tension is not too great, the driving members may continue to rotate relative to the driven elements or over-run, causing the studs 4 to pass entirely out of and beyond the particular cam depressions 9 in which they are originally engaged until they enter the next succeeding cam grooves. The descent of the studs into the deeper areas of the succeeding depressions 9 will relax the tension of the parts and temporarily relieve the driving engagement. This will be repeated until a fuse is blown, or the motor stalled, thus arresting operation.

The present coupling is applicable to a wide variety of installations wherein it is ordinarily necessary to start under load. By the use of the instant coupling structure the driving motor is permitted a slight initial free movement sufficient to get under way before meeting the resistance of the driven load. Among other installations where this capacity for a free initial starting motion is found desirable is in airplane propeller driving connections. Likewise when used as a driving connection between an electric motor and the driven load, the capacity for initial free starting movement of the motor tends to protect the power line against voltage fluctuations, and prevents injury to the motor under unfavorable conditions, such, for example, under conditions where the power line voltage is insufficient to start the motor under full load, due to a drop in voltage in the power line.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statutes, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A frictional shaft coupling comprising the combination with two relatively rotatable shafts disposed in axial alignment and capable of limited axial movement, of a pair of conical discs one disc being fixedly mounted on each shaft in relatively spaced relation with conical faces disposed one toward the other, a pair of concavo-convex rings between the discs with their concave sides enclosing the conical faces of the respective disc, a circular series of grooved cam depressions in the concave face of each ring, a circular series of spaced studs carried by each disc and seating within the depressions of the corresponding ring, an annular friction element interposed between the rings and frictionally gripped thereby upon axial adjustment of the rings incident to relative rotary motion of the rings and discs, and a housing surrounding the discs and rings and interposed friction element upon which the discs axially abut to limit axial movement of the shafts under expanding pressure incident to axial adjustment of the rings.

2. In an assembly of the character described, a pair of relatively spaced driving and driven members, a pair of clamp rings interposed therebetween for rotary and axial adjustment relative to the discs, an interposed frictional element gripped between the clamp rings by their approach one toward the other interengaging cam surfaces upon the contiguous faces of the discs and rings whereby a limited rotary adjustment of a disc and ring one relative to the other will cause the clamp rings to approach one toward the other to effect a clamping engagement of the interposed frictional element to transmit further rotary motion from one disc to the other, and a housing surrounding the assembly.

3. An assembly of the character described, comprising a pair of oppositely disposed conical discs axially aligned with each other comprising driving and driven members, complementary concavo-convex rings associated with the discs for relative rotary and axial adjustment, an annular frictional element interposed between the rings, interengaging cam surfaces upon the rings and associated discs whereby independent rotary movement of one of said members relative to the other will effect an axial adjustment of the ring into increased frictional engagement with the interposed frictional element to transmit rotary motion from one conical disc to the other.

4. An automatic coupling device including revoluble driving and driven members arranged in axial spaced relation, relatively spaced clamp members disposed contiguous to the adjacent faces of the driving and driven members, for relative rotary and axial adjustment, interengaging cam surfaces upon the contiguous faces of the clamp members and adjacent driving and driven members whereby rotary motion of the clamp members and driving and driven members one relative to the other will effect axial adjustment of the clamp members one toward the other, and a friction element interposed between the clamp members and operatively engaged thereby for transmitting rotary motion from the driving member and associated clamp member to the driven member and associated clamp member.

5. A shaft coupling including a pair of axially disposed relatively spaced revoluble discs comprising driving and driven members, a pair of rings, one disposed adjacent to the continuous face of each disc for relative rotary and axial adjustment, and a frictional spacer element intermediate the rings, and means for effecting axial adjustment of the rings relative to the discs coincident with the rotary adjustment thereof to increase the frictional engagement of the rings with the interposed spacer element to thereby transmit rotary motion from one disc to the other.

6. In an assembly of the character described, two pairs of relatively rotatable members, the members of each pair being axially adjustable one relatively to the other incident to their relative rotary adjustment, cam means effective upon relative rotary adjustment thereof to effect axial adjustment of the members and an intermediate friction element gripped between the pair of members by such relative axial adjustment of at least one of the movable members thereof to transmit rotary motion from one pair of elements to the other.

7. A coupling device for an axially aligned driving shaft and a shaft to be driven, and which shafts have their adjacent ends normally freely movable relatively to each other, comprising means rendered effective by a progressively increasing wedging action in an axial direction induced by rotation of the driving shaft for effecting a driving connection between the shafts.

8. A coupling device for an axially aligned driving shaft and a shaft to be driven, and which shafts have their adjacent ends normally freely movable relatively to each other, comprising means rendered effective by a progressively increasing wedging action induced by rotation of the driving shaft, and resistance to rotation of the shaft to be driven, for effecting a driving connection between the shafts.

9. A coupling device for an axially aligned driving shaft and a shaft to be driven, and which shafts have their adjacent ends normally freely movable relatively to each other, comprising means rendered effective by a progressively increasing wedging action in an axial direction induced by rotation of the driving shaft for effecting a driving connection between the shafts, said wedging means being adjustable to vary the degree of wedging action necessary to produce a driving connection between the driving shaft and the shaft to be driven.

10. A coupling device for an axially aligned driving shaft and a shaft to be driven, and which shafts have their adjacent ends normally freely movable relative to each other, comprising a free moving member intermediate the adjacent ends of the shaft to be driven and the driving shaft, means induced by rotation of the driving shaft for producing a wedging action on said intermediate member in one direction whereby to rotate said intermediate member, and means induced by rotation of said intermediate member to produce a wedging action between said last named member and said shaft to be driven oppositely to the direction of the first mentioned wedging action whereby said driving shaft and said shaft to be driven will move at the same rate of speed.

11. A coupling device for an axially aligned driving shaft and a shaft to be driven, and which shafts have their adjacent ends normally freely movable relative to each other, comprising a free moving member intermediate the adjacent ends of the shaft to be driven and the driving shaft, means induced by rotation of the driving shaft for producing a wedging action on said intermediate member in one direction whereby to rotate said intermediate member, and means induced by rotation of said intermediate member to produce a wedging action between said last named member and said shaft to be driven oppositely to the direction of the first mentioned wedging action whereby said driving shaft and said shaft to be driven will move at the same rate of speed, said wedging actions being relieved when said driven shaft is not positively rotated.

12. A coupling device for an axially aligned driving shaft and a shaft to be driven, and which shafts have their adjacent ends normally freely movable relative to each other, comprising a free moving member intermediate the adjacent ends of the shaft to be driven and the driving shaft, means induced by rotation of the driving shaft for producing a wedging action on said intermediate member in one direction whereby to rotate said intermediate member, and means induced by rotation of said intermediate member to produce a wedging action between said last named member and said shaft to be driven oppositely to the direction of the first mentioned wedging action whereby said driving shaft and said shaft to be driven will move at the same rate of speed, said wedging actions providing a delayed driving connection between said driving shaft and said shaft to be driven.

EDWARD L. RIESKE.